(12) United States Patent
Jones et al.

(10) Patent No.: US 6,560,377 B2
(45) Date of Patent: May 6, 2003

(54) NON-HERMETIC PACKAGING FOR LITHIUM NIOBATE-BASED DEVICES

(75) Inventors: Christopher D. W. Jones, New Providence, NJ (US); Glen David Wilk, New Providence, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/968,124

(22) Filed: Oct. 1, 2001

(65) Prior Publication Data

US 2003/0063830 A1 Apr. 3, 2003

(51) Int. Cl.[7] .............................................. G02B 1/035
(52) U.S. Cl. .................... 385/2; 385/8; 385/94
(58) Field of Search .......................... 385/3, 2, 9, 88, 385/94, 131

(56) References Cited

U.S. PATENT DOCUMENTS

| | | | |
|---|---|---|---|
| 5,165,956 A | 11/1992 | Wong | 427/196 |
| 5,243,756 A | 9/1993 | Hamburgen et al. | 29/841 |
| 5,300,461 A | 4/1994 | Ting | 437/227 |
| 5,877,093 A | 3/1999 | Heffner et al. | 438/761 |
| 5,888,850 A | 3/1999 | Havens et al. | 438/127 |
| 5,935,638 A | 8/1999 | Chandra et al. | 427/58 |
| 5,949,944 A | 9/1999 | Minford et al. | 385/131 |
| 5,951,813 A | 9/1999 | Warren | 156/305 |
| 6,033,126 A | 3/2000 | Omori et al. | 385/88 |
| 6,198,854 B1 * | 3/2001 | Takagi | 359/332 |
| 6,198,855 B1 * | 3/2001 | Hallemeier et al. | 385/2 |
| 6,259,551 B1 | 7/2001 | Jacobs | 359/298 |
| 6,278,822 B1 * | 8/2001 | Dawnay | 385/132 |
| 6,323,297 B1 * | 11/2001 | Lee et al. | 427/248.1 |

OTHER PUBLICATIONS

Wooten, Kissa, Yi–Yan, Murphy, Lafaw, Hallemeier, Maack, Attanasio, Fritz, McBrien, Bossi, "A Review of Lithium Niobate Modulatrors for Fiber–Optic Communications Systems" IEEE Journal of Selected Topics in Quantum Electronics, vol. 6, No. 1, Jan./Feb. 2000.

* cited by examiner

Primary Examiner—Tulsidas Patel
(74) Attorney, Agent, or Firm—Wendy W. Koba

(57) ABSTRACT

A lithium niobate-based electro-optic device is formed to include a parylene conformal coating layer, as a sealant against moisture. The use of parylene (preferably, parylene-C) has been found to form an acceptable moisture vapor barrier without the need for additional hermetic packaging of the electro-optic device.

17 Claims, 5 Drawing Sheets

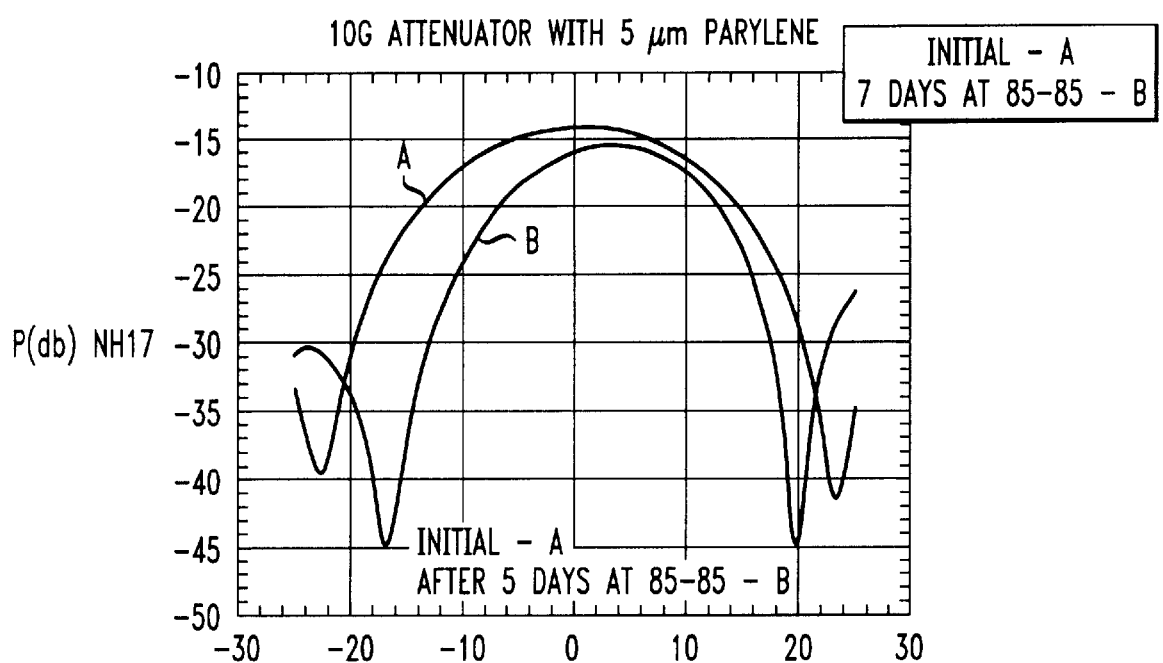

NON-HERMETIC PACKAGING FOR LITHIUM NIOBATE-BASED DEVICES

TECHNICAL FIELD

The present invention relates to lithium niobate-based electro-optic devices and, more particularly, to the utilization of a particular device coating to eliminate the need for hermetic packaging of these devices.

BACKGROUND OF THE INVENTION

Electro-optic devices employing materials such as lithium niobate are often used as modulators in optical communication systems, with optical waveguides formed in a lithium niobate substrate (for example, Ti-diffused waveguides or proton-exchanged waveguides) and electrodes disposed over the waveguides on the top surface of the lithium niobate substrate. In a lithium niobate modulator, by controlling the voltage applied to the surface electrodes, an input optical signal will be modulated as it propagates along the waveguides and thus exit as an optically modulated signal. Other uses of lithium niobate-based devices include attenuators, polarization controllers, switches, sensors, and the like.

While such devices, and in particular modulators, are well-known and used extensively in optical communication systems, the devices are likely to fail within a short period of time if they are not hermetically sealed (i.e., sealed against the ingress of water and/or high humidity levels). Although all of the failure mechanisms are not known, it is suspected that several failure mechanisms occur on the lithium niobate substrate itself. For example, when closely-spaced electrodes (e.g., gold electrodes) have a large voltage difference between them (which is common in most modulator applications), the presence of water or a high humidity level causes the electrodes to short and the device to fail. Corrosion is also an issue when both high electric fields and high humidity are involved.

To overcome these problems, lithium niobate-based devices are conventionally subjected to a hermetic sealing process during packaging to eliminate the presence of moisture in the package and prevent the further ingress of water during the life of the packaged device. Hermetic sealing is expensive and time-consuming, requiring the package to be out-gassed to eliminate moisture, then filled with an inert gas and welded or soldered shut. An enormous savings in cost, as well as an increase in throughput efficiency could be achieved if a practical non-hermetic package could be made, without compromising the performance characteristics required for most commercial applications.

SUMMARY OF THE INVENTION

The need remaining in the prior art is addressed by the present invention, which relates to lithium niobate-based electro-optic devices and, more particularly, to the utilization of a particular device coating to eliminate the need for hermetic packaging of these devices.

In accordance with the present invention, a water vapor barrier layer comprising paylene (more specifically, parylene-C, -D, -F or -N) is disposed to coat the lithium niobate-based device. Parylene is very resistant to water penetration, and is effective at preventing localized accumulation of moisture (e.g., $H_2O$ or OH) molecules at the electrode interface or on the top surface of the lithium niobate-based itself. The parylene film also provides a barrier to surface migration of metal atoms or complexes from the electrodes. In accordance with the present invention, the parylene is deposited at room temperature. It is desirable to use a coating material with a dielectric constant close to that of air (k=1). Parylene films exhibit a dielectric constant in the range of approximately 2.5 to 5.

It is an aspect of the present invention that the parylene film is highly conformal to device topography and does not add stress to the underlying device. The parylene film also adheres equally well to disparate surfaces, namely, the electrode surface and the top surface of the lithium niobate substrate. With proper pre-cleaning treatment of the lithium niobate substrate surface (e..g, a plasma etching with oxygen or argon, or alternatively, a wet chemical clean), the deposited parylene film will form a high quality adhesive to the underlying substrate and the surface electrodes.

Other and further aspects of the present invention will become apparent during the course of the following discussion and by reference to the accompanying drawings.

BRIEF DESCRIPTION OF THE DRAWINGS

Referring now to the drawings,

FIG. 8 is a graph illustrating the performance of a parylene sealed lithium niobate optical attenuator, showing both its initial performance and performance after five days.

DETAILED DESCRIPTION

Figure 1:
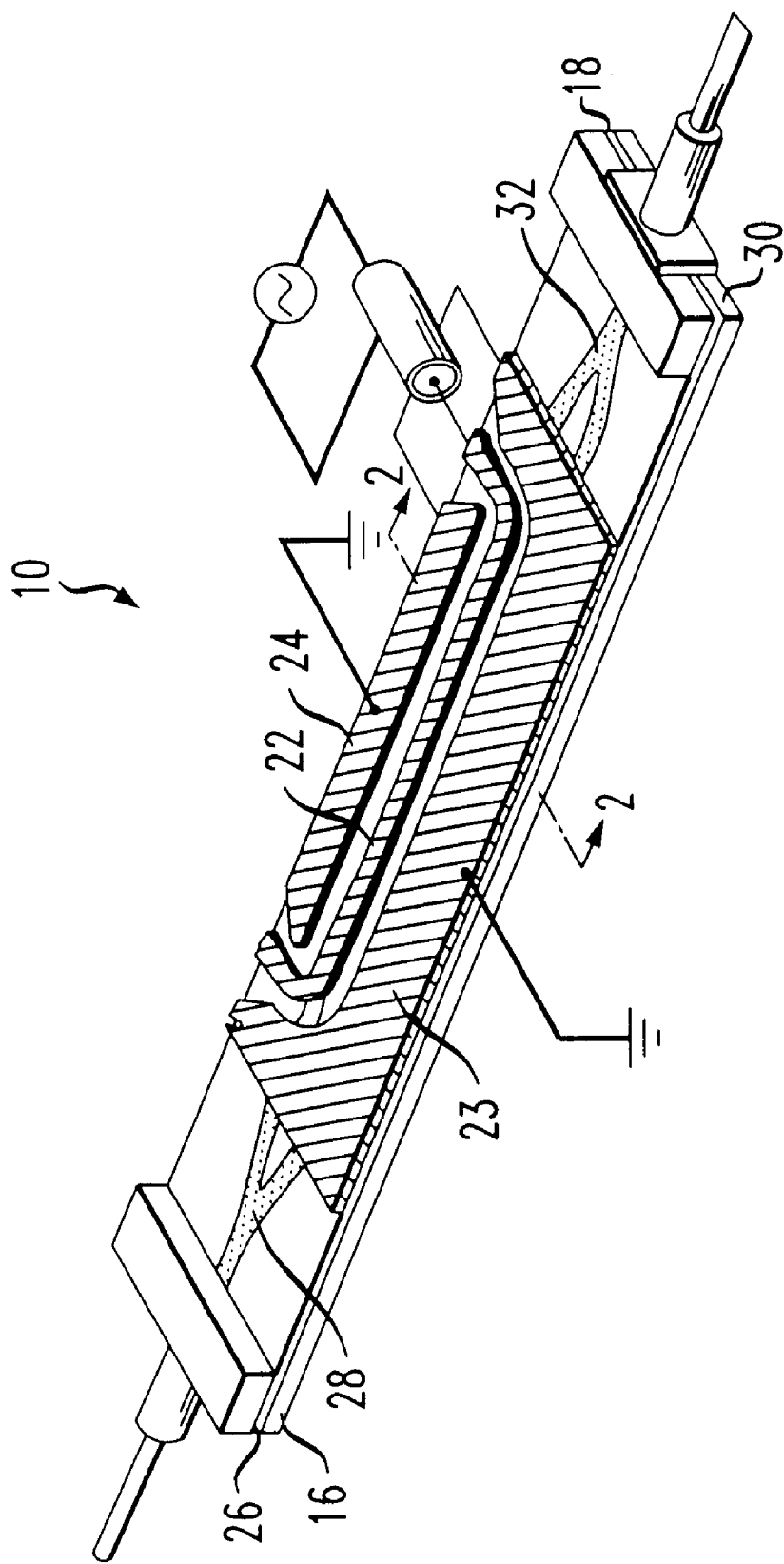
FIG. 1 contains an isometric view of an exemplary prior art lithium niobate-based electro-optic device, in this case, an optical modulator.
Figure 2:
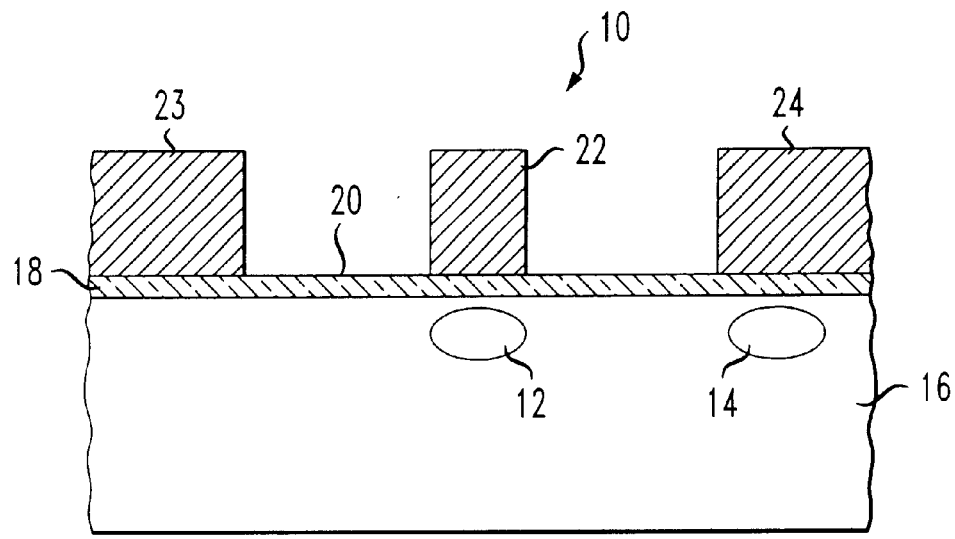
FIG. 2 is a cut-away side view of the device of FIG. 1, taken along line 2—2.

FIG. 1 contains an isometric view of a conventional lithium niobate optical modulator 10, where FIG. 2 is a cut-away side view of modulator 10, illustrating in particular the location of optical waveguides 12, 14 within lithium niobate substrate 16. Waveguides 12, 14 may comprise titanium-diffused waveguides, proton-exchanged waveguides, or any other suitable guides for containing optical waves within a lithium niobate substrate. A buffer layer 18 may then be formed over top surface 20 of substrate 16, and metal electrodes 22, 23 and 24 disposed as shown to cover portions of waveguides 12 and 14, as well as a portion of the lithium niobate substrate surface area. The application of a voltage to a signal electrode (e.g., electrode 22) causes a change in the index of refraction of the underlying waveguide and thus affects the propagation of light through the modulator, where an input optical signal as applied as shown in FIG. 1 along a first endface 26 of substrate 16 at the location of an input waveguide 28, the output optical signal exiting along the opposing endface 30 from an output waveguide 32. In particular, input signal light enters along input waveguide 28, travels through both waveguides 12 and 14, and then exits along output waveguide 32. When a drive voltage is applied to signal electrode 22 and the remaining electrodes 23, 24 are held at ground potential, a phase difference is produced between the optical signals propagating along the two signal paths, resulting in the generation of a optically modulated output signal.

Figure 3:
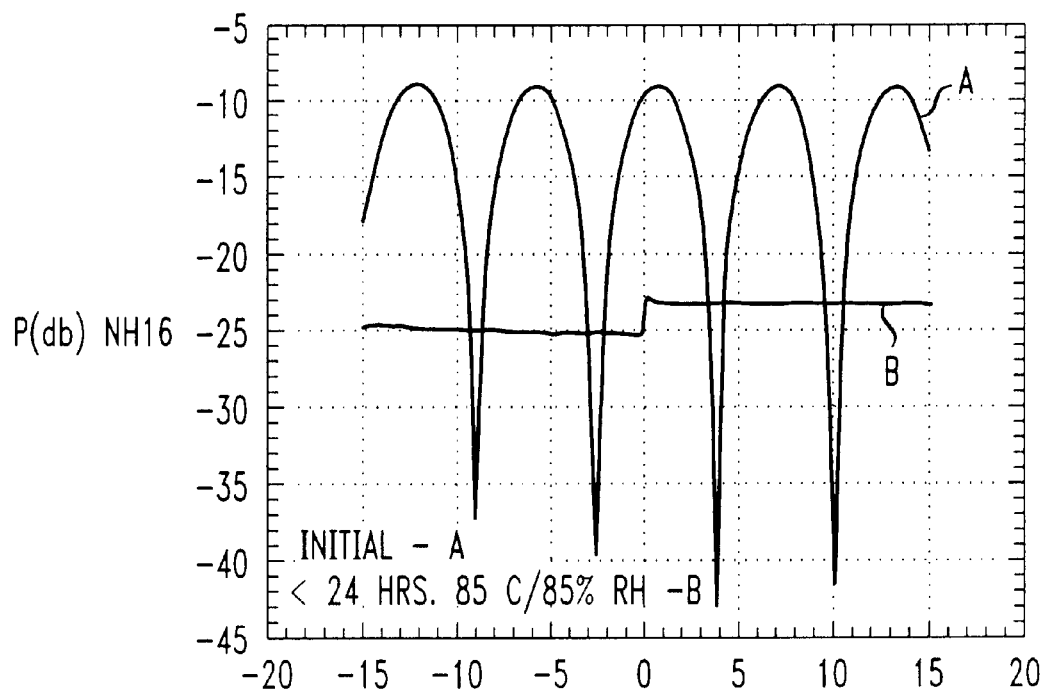
FIG. 3 is a graph illustrating the performance failure of an exemplary lithium niobate modulator when not protected within a hermetic package.

It is known that lithium niobate-based devices are subjected to failure if left exposed to normal atmospheric conditions. Primarily, water moisture and high humidity conditions will result in rendering a lithium niobate-based electro-optic device inoperable. As mentioned above, the existence of a large voltage potential between the electrodes (as, for example between electrode 22 and electrodes 23,24) may cause the electrodes to short and the device to fail. FIG. 3 is a graph depicting, along line A, the modulation characteristics of an exemplary lithium niobate modulator, such as modulator 10 of FIG. 1, immediately after manufacture. Within twenty-four hours, an unprotected device (i.e., a device that has not been sealed against moisture) has experienced failure, as shown along line B. Clearly, such performance is unacceptable and has been improved in the prior art by packaging lithium niobate-based devices in a "hermetic" package—a package which has been out-gassed to remove all atmosphere and water vapor (replaced with an inert gas such as argon), then sealed to prevent intrusion of moisture into the package. As discussed above, the use of hermetic sealing is both costly and time-consuming.

Figure 4:
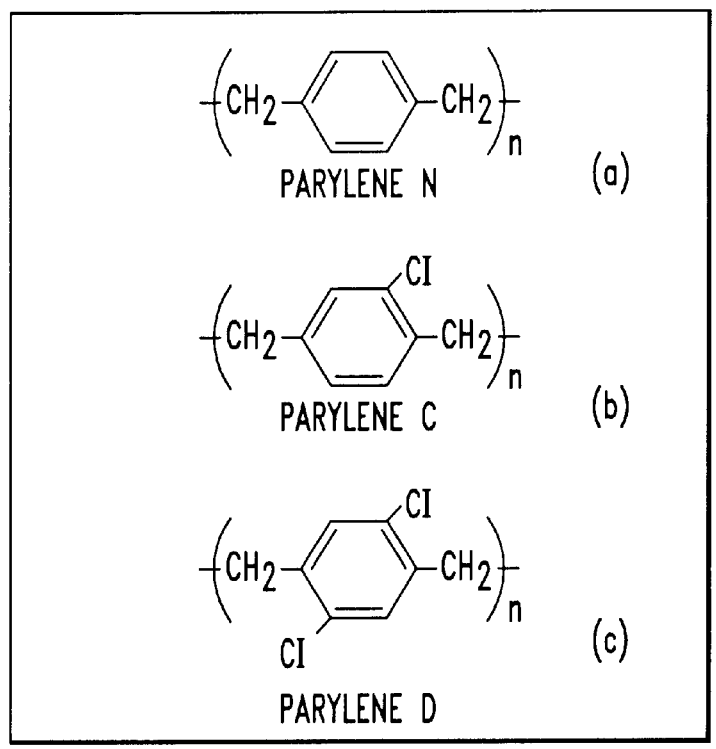
FIG. 4 contains diagrams of three exemplary chemical structures for parylene polymers that may be used to provide a hermetic coating for lithium niobate-based devices in accordance with the present invention.

In accordance with the present invention, therefore, it is proposed to use a layer of parylene as a barrier to water vapor to prevent localized accumulation of moisture molecules, as well as a barrier to the surface migration of atoms or complexes from the electrodes, by sealing a lithium niobate-based device structure and preventing intrusion of moisture. The parylene-sealed electro-optic device may then simply be inserted in a non-hermetic package at a significant savings of both time and cost. FIG. 4 illustrates three basic chemical structures of parylene, where parylene is the generic name for members of a unique polymer series. The basic member of the series, defined as parylene-N, is illustrated in FIG. 4(*a*) and is a poly-paraxylylene, a linear polymer. Parylene-N exhibits a dielectric constant of approximately 2.65 over a frequency range from 60 Hz–1 MHz. Parylene-C is produced from the same monomer as parylene-N, modified only by the substitution of a chlorine atom for one of the aromatic hydrogens, as shown in FIG. 4(*b*). Parylene-C exhibits a dielectric constant in the range of 3.15–2.95 over the frequency range of 60 Hz–1 MHz. Parylene-F (not shown) has a structure very similar to that of parylene-C, the difference being the substitution of a fluorine atom for the chlorine atom (which replaces an aromatic H in the basic parylene structure). Parylene-F has been found to have a dielectric constant about 10% less than parylene-C, while still providing the desired benefits of resistance to moisture and prevention of the localized accumulation of moisture across the surface of the device. FIG. 4(*c*) illustrates the chemical structure for parylene-D, which comprises the substitution of chlorine atoms for two of the aromatic hydrogens. Parylene-D is similar in properties to parylene-C, but exhibits a dielectric constant of 2.84–2.80 over the same frequency range. In general, parylene provides a thin, polymer conformal coating, where parylene-C has been shown to form the best water barrier of the various types.

Figure 5:
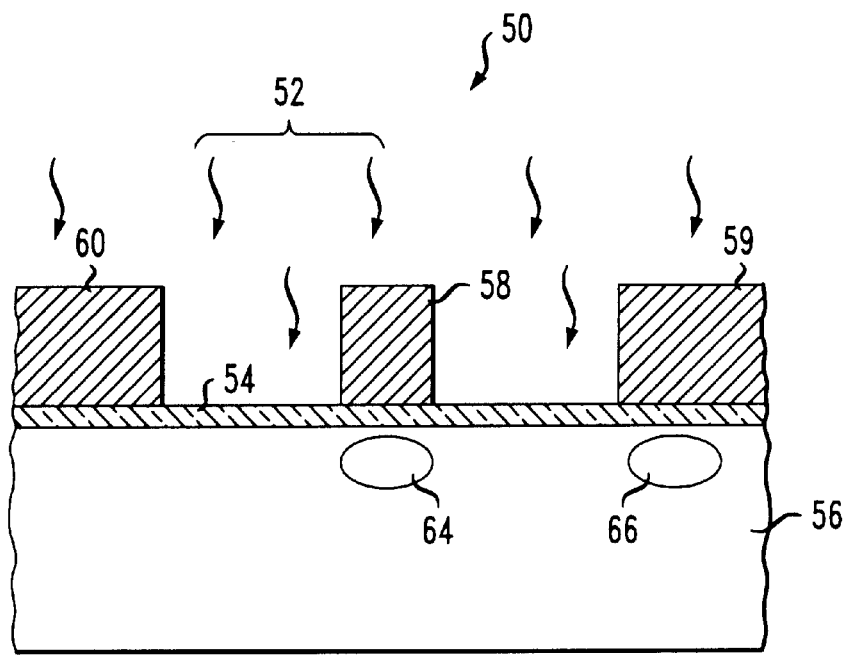
FIG. 5 is a cut-away side view of an exemplary lithium niobate-based electro optic device, illustrating a pre-cleaning treatment that may be used prior to applying a parylene sealant in accordance with the present invention.

In accordance with the present invention, therefore, a lithium niobate-based electro-optic device (such as a modulator) is first produced in its normal fashion, and included on a conventional submount structure for insertion in a package. At this point, the parylene material is deposited to conformally coat the device (i.e., evenly cover all exposed surface areas) and provide the required moisture vapor barrier. In a preferred process, the lithium niobate device is first cleaned to remove initial organic material and surface impurities from the device, where remnants of such would result in poor adhesion of the parylene material to the device. FIG. 5 is a cut-away side view of an exemplary lithium niobate modulator 50, illustrating the use of a plasma treatment (as denoted by arrows 52) to remove debris from surface 54 of substrate 56. This plasma treatment also advantageously serves to "roughen" the surface of electrodes 58, 59 and 60, where the rough surface also improves the adhesion of the parylene material. An oxygen plasma and/or argon may be used for this purpose, maintained at a power of, for example, less than 100 Watts (although the use of argon or other inert gases are not as efficient at the removal of organic materials and may require a slightly higher power level). As an alternative to plasma etching to remove debris, a wet chemical etching may be used (the etchant chosen to be selective with respect to both lithium niobate and the metal electrodes).

Figure 6:
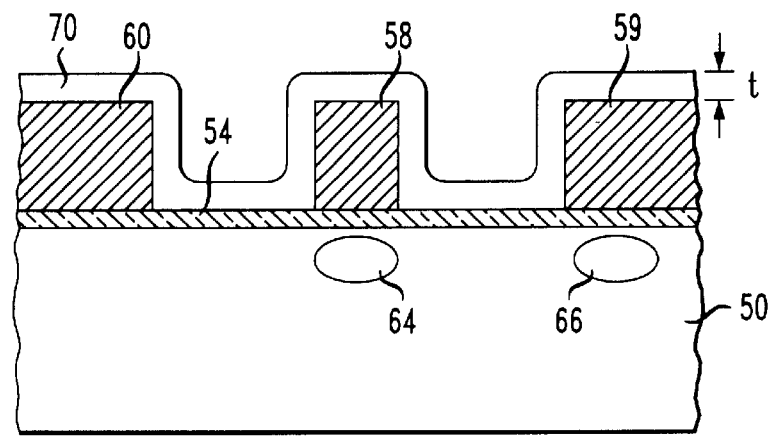
FIG. 6 is a cut-away side view of an exemplary lithium niobate-based electro-optic device including a parylene water vapor barrier layer formed in accordance with the present invention.

Once the surface debris has been removed, the parylene coating may be deposited, as shown in FIG. 6, which illustrates the formation of a parylene sealant layer 70 on modulator 50. In accordance with the present invention, the deposition of parylene is accomplished at room temperature (thus, no high temperature damage to modulator 50 will be incurred). The thickness t of parylene layer 60 is chosen to be in the range of, for example, 0.1–20 $\mu$m. If the layer becomes too thick, the device will exhibit increased capacitance (albeit that the moisture barrier exhibits excellent protection characteristic); a relatively thin layer will have a better (lower) capacitance, at the expense of being less impervious to water intrusion. The smaller 0.1–2 $\mu$m range has been found to form a preferred water barrier in terms of also exhibiting a relatively low capacitance. Moreover, parylene-C has been found to be the preferred polymer, exhibiting a dielectric constant of approximately 2–3 in the preferred thickness range.

Figure 7:
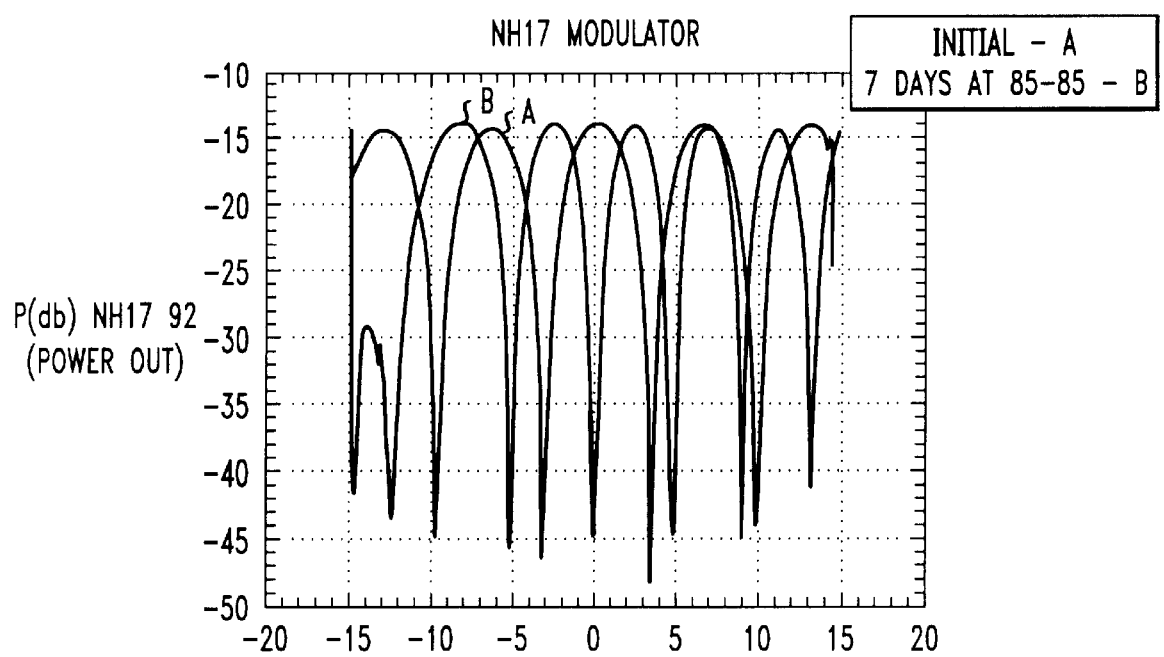
FIG. 7 is a graph illustrating the performance of a parylene sealed lithium niobate optical modulator, showing both its initial performance and performance after seven days.

FIG. 7 is a graph illustrating the modulation performance of a lithium niobate modulator including a 5 $\mu$m thick parylene moisture barrier layer of the present invention. Graph A of FIG. 7 illustrates the performance of the device immediately after fabrication. Graph B illustrates the performance of the device after seven days, with no other sealant or hermetic packaging being applied. As shown, the results are very similar to the initial graph A, indicating that the parylene-C performs well as a moisture barrier.

FIG. 8 is a graph illustrating the performance of a lithium niobate-based optical attenuator which has been coated with a 5 $\mu$m parylene sealant layer in accordance with the present invention. As with the other graphs, line A represents the initial performance characteristics of the attenuator. Line B represents the performance of the attenuator after five days. Like the case of the modulator, the performance of the attenuator remains well within a useable range without the need for additional hermetic packaging.

Thus, it is been found that the use of a parylene polymer conformal coating will satisfy the moisture barrier requires for lithium niobate-based electro-optic devices, allowing such devices to then be packaged in non-hermetic housings at a significant cost savings. It is to be understood that any of the parylene polymers (i.e., -N, -C, -F or -D) may be used, where parylene-C is considered to be the preferred alternative. In general, the spirit and scope of the present invention is considered to be limited only by the claims appended hereto.

What is claimed is:

1. An optical device comprising
   a lithium niobate substrate defined as comprising a top major surface;
   optical waveguiding regions formed in said lithium niobate substrate;
   a plurality of electrodes disposed on said lithium niobate substrate top major surface in predetermined locations with respect to said optical waveguiding regions; and
   a parylene moisture barrier protective layer comprising a predetermined thickness and formed as a conformal coating over the lithium niobate substrate top major surface and said plurality of electrodes.

2. An optical device as defined in claim 1 wherein the parylene layer is chosen from the group consisting of parylene-N, parylene-C, parylene-F and parylene-D.

3. An optical device as defined in claim 2 wherein the parylene layer comprises parylene-C.

4. An optical device as defined in claim 1 wherein the parylene layer comprises a predetermined thickness in the range of 0.1–20 μm.

5. An optical device as defined in claim 4 wherein the parylene layer comprises a thickness in the range of 01.–2 μm.

6. An optical device as defined in claim 1 wherein the optical device comprises a lithium niobate electro-optic modulator.

7. A method of sealing a lithium niobate-based electro-optic device to form a moisture barrier and eliminate the need for hermetic packaging, the method comprising the steps of:
   providing a lithium niobate-based electro-optic device, as defined as comprising a top major surface including at least one electrode, formed on a lithium niobate substrate including optical waveguides; and
   depositing a conformal coating of a parylene polymer material as the moisture barrier over the cleaned top major surface of said electro-optic device, depositing a parylene layer of a predetermined thickness.

8. The method as defined in claim 7 wherein prior to performing the parylene deposition process, the following step is performed:
   cleaning said lithium niobate-based electro-optic device to remove surface organics and debris.

9. The method as defined in claim 8 wherein a plasma etching process is used to perform the cleaning.

10. The method as defined in claim 8 wherein oxygen plasma etching is used.

11. The method as defined in claim 8 wherein argon plasma etching is used.

12. The method as defined in claim 8 wherein a combination of oxygen and argon plasmas are used.

13. The method as defined in claim 8 wherein a wet chemical etching process is used to perform the cleaning.

14. The method as defined in claim 7 wherein in performing the parylene deposition process, the parylene is chosen from the group consisting of parylene-N, parylene-C, parylene-F, and parylene-D.

15. The method as defined in claim 14 wherein parylene-C is deposited.

16. The method as defined in claim 7 wherein in performing the parylene deposition process, a conformal layer of parylene having a thickness in range of 0.1–20 μm is deposited.

17. The method as defined in claim 16 wherein a parylene layer having a thickness in the range of 0.1–2 μm. is deposited.

* * * * *